(12) United States Patent
Hamaguri (10) Patent No.: US 6,462,777 B1
(45) Date of Patent: Oct. 8, 2002

(54) DISPLAY CHARACTERISTIC MEASUREMENT APPARATUS FOR A COLOR DISPLAY APPARATUS, AND A METHOD FOR CALIBRATING THE SAME

(75) Inventor: Kenji Hamaguri, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/114,489

(22) Filed: Jul. 13, 1998

(30) Foreign Application Priority Data

Jul. 15, 1997 (JP) ............................................. 9-190194

(51) Int. Cl.$^7$ .............................. H04N 17/00; H04N 9/43
(52) U.S. Cl. ....................... 348/188; 348/190; 348/745; 348/177
(58) Field of Search .................................. 348/180, 184, 348/189, 191, 185, 186, 655, 656, 657, 658, 807, 745, 746, 747, 177, 179, 190, 188, 47, 139, 159, 187, 806; H04N 17/00, 9/73, 5/45

(56) References Cited

U.S. PATENT DOCUMENTS

| | | | |
|---|---|---|---|
| 4,686,429 A | * 8/1987 | Fendley | 348/807 |
| 4,857,998 A | * 8/1989 | Tsujihara et al. | 348/747 |
| 4,943,850 A | * 7/1990 | Asaida | 358/55 |
| 5,032,769 A | * 7/1991 | Kawakami | 348/807 |
| 5,049,791 A | * 9/1991 | Kawakami | 315/368 |
| 5,396,331 A | * 3/1995 | Kitoh et al. | 356/611 |
| 5,440,340 A | * 8/1995 | Tsurutani et al. | 348/190 |
| 5,455,647 A | * 10/1995 | Fujiwara | 348/745 |
| 5,473,394 A | * 12/1995 | Hideyuki | 348/807 |
| 5,532,764 A | * 7/1996 | Itaki | 348/745 |
| 5,536,192 A | 7/1996 | Byun | 445/3 |
| 5,835,135 A | * 11/1998 | Hamaguri et al. | 348/191 |
| 5,923,366 A | * 7/1999 | Kawashima et al. | 348/190 |
| 5,939,843 A | * 8/1999 | Kimoto et al. | 348/807 |
| 6,310,644 B1 | * 10/2001 | Keightley | 348/140 |

FOREIGN PATENT DOCUMENTS

JP 11098542 * 4/1999

* cited by examiner

Primary Examiner—John Miller
Assistant Examiner—Brian Yenke
(74) Attorney, Agent, or Firm—McDermott, Will & Emery (57) ABSTRACT

A color display characteristic measurement apparatus is provided with a first image pickup device for picking up an image of a first color component, a second image pickup device for picking up an image of a second color component, a measurement image generator for causing a color display apparatus to display a measurement image thereon, the measurement image being displayed in a single color to which both the first image pickup device and the second image pickup device are sensible, and a calculator for calculating, based on a first picked-up image of the first image pickup device and a second picked-up image of the second image pickup device, calibration data for calibrating a relative displacement between the first and second image pickup devices.

17 Claims, 7 Drawing Sheets

DISPLAY CHARACTERISTIC MEASUREMENT APPARATUS FOR A COLOR DISPLAY APPARATUS, AND A METHOD FOR CALIBRATING THE SAME

This application is based on patent application No. 9-190194 filed in Japan, the contents of which is hereby incorporated by reference.

BACKGROUND OF THE INVENTION

This invention relates to a display characteristic measurement apparatus for a color display apparatus which picks up an image of a measurement pattern displayed on a color display apparatus such as a color CRT (Cathode Ray Tube) and measures a display characteristic such as a convergence based on this image signal.

Conventionally, there has been known a display characteristic measurement apparatus for measuring a display characteristic such as a convergence of a display apparatus such as a color CRT, a color LCD (Liquid Crystal Display) or a color PDP (Plasma Display Panel). This display characteristic measurement apparatus includes an image pickup unit for picking up an image of a specified measurement pattern color-displayed on a display apparatus to be measured while separating this image into images of the respective color components of R (red), G (green) and B (blue), an image processor for conducting a predetermined measurement after processing the images of the respective color components, and a display device for displaying the measurement result.

For example, as disclosed in Japanese Unexamined Patent Publication No. 8-307908, a convergence measurement apparatus picks up an image of a specified white measurement pattern displayed on a color CRT to be measured by a camera provided with a color area sensor such as CCDs, calculates a luminance center for every picked image of each color component R, G or B during the image processing, and displays a relative displacement of these luminance centers as a misconvergence amount.

The convergence measurement apparatus calculates a luminous position (luminous center position) of the measurement pattern of each color component on a display surface of the color CRT to be measured based on a focusing position (luminance center position) of the measurement pattern of each color component on a sensing surface of the color camera, and calculates a relative displacement of the luminous positions of the respective color components. Accordingly, the accuracy of the convergence measurement is largely affected by the calculation accuracy of the focusing position (luminance center position) of the measurement pattern of each color component on the sensing surface.

Particularly in the case that a color camera of three-plate type is used, a light image is separated into images of three primary color components, and three area sensors are independently provided so as to conform to the respective color components of R, G, B at the respective emergence ends of a dichroic prism for emitting the images of the respective color components in different directions. Accordingly, the measurement accuracy easily varies due to displacements of the respective area sensors caused by temperature and humidity variations.

Figure 9:
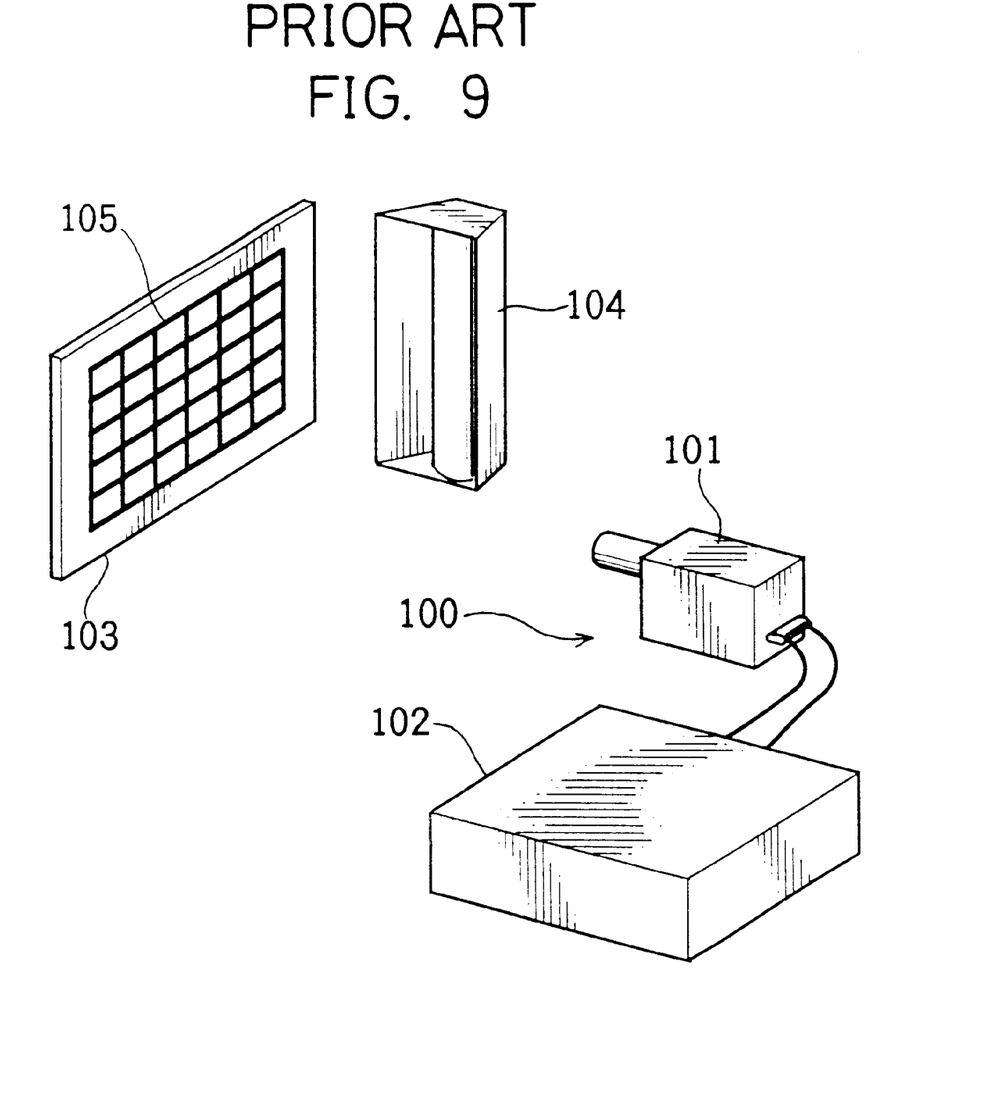
FIG. 9 is a perspective view showing a conventional method for calibrating a convergence measurement apparatus using a calibration chart.

Accordingly, the conventional convergence i measurement apparatus is calibrated using a special calibration chart before a measurement as shown in FIG. 9. A calibration method shown in FIG. 9 is such that an image of a calibration chart 103 (a chart in which a crosshatched pattern 105 is drawn on an opaque white plate) illuminated by a fluorescent lamp 104 is picked up by an image pickup unit 101 of the convergence measurement apparatus 100 and a calibration data representing a relative positional relationship of the respective area sensors is calculated using the picked image. The calculated calibration data is stored in a memory in an apparatus main body 102 and used as a data for calibrating a displacement of the luminance center position of the measurement pattern of each color component during the convergence measurement.

According to the conventional method for calibrating the relative displacement of the area sensors, the positions (absolute positions) of the respective area sensors in reference coordinate systems in a convergence measuring system are calculated using the image data of the respective color components obtained by picking up the image of the special calibration chart, and the relative displacement of the area sensors is calculated based on this calculation result. Thus, there is a disadvantage of many operation parameters which necessitates a longer operation time.

Further, since not the measurement pattern displayed on the CRT to be measured, but the special calibration chart is used, it is inconvenient and difficult to calibrate convergence measuring systems at a production line.

SUMMARY OF THE INVENTION

It is an object of the present invention to provide a display characteristic measurement apparatus which has overcome the problems residing in the prior art.

It is another object of the present invention to provide a method for calibrating a display characteristic measurement apparatus which has overcome the problems residing in the prior art.

According to an aspect of the present invention, a display characteristic measurement apparatus for a color display apparatus, comprises: a first image pickup device which picks up an image of a first color component; a second image pickup device which picks up an image of a second color component; a measurement image generator which causes a color display apparatus to display a measurement image thereon, the measurement image being displayed in a single color to which both the first image pickup device and the second image pickup device are sensible; and a calculator which calculates, based on a first picked-up image picked up by the first image pickup device and a second picked-up image picked up by the second image pickup device, calibration data for calibrating a relative displacement between the first image pickup device and the second image pickup device.

According to another aspect of the present invention, a display characteristic measurement apparatus for a color display apparatus, comprises: a first image pickup device which picks up an image of a first color component; a second image pickup device which picks up an image of a second color component; a measurement image generator which causes a color display apparatus to display a measurement image thereon, the measurement image being displayed in a single color to which both the first image pickup device and the second image pickup device are sensible; a first position calculator which calculates, based on a first picked-up image picked up by the first image pickup device, a position on the first image pickup device that corresponds to a specified position of the measurement image on the color display apparatus; a second position calculator which calculates, based on a second picked-up image picked up by the second image pickup device, a position on the second image pickup device that corresponds to the specified position of the measurement image on the color display apparatus; and a displacement calculator which calculates, based on first and second positions calculated by the first and second position calculators, a relative displacement between the first image pickup device and the second image pickup device.

According to another aspect of the present invention, a method for calibrating a relative displacement between a first image pickup device for picking up an image of a first color component and a second image pickup device for picking up an image of a second color component provided in a display characteristic measurement apparatus for a color display apparatus, comprises the steps: causing a color display apparatus to display a measurement image thereon, the measurement image being displayed in a single color to which both the first image pickup device and the second image pickup device are sensible; picking up images of the measurement image displayed on the color display apparatus by the first and second image pickup devices, respectively; calculating, based on picked-up images of the first and second image pickup devices, calibration data for calibrating a relative displacement between the first image pickup device and the second image pickup device.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
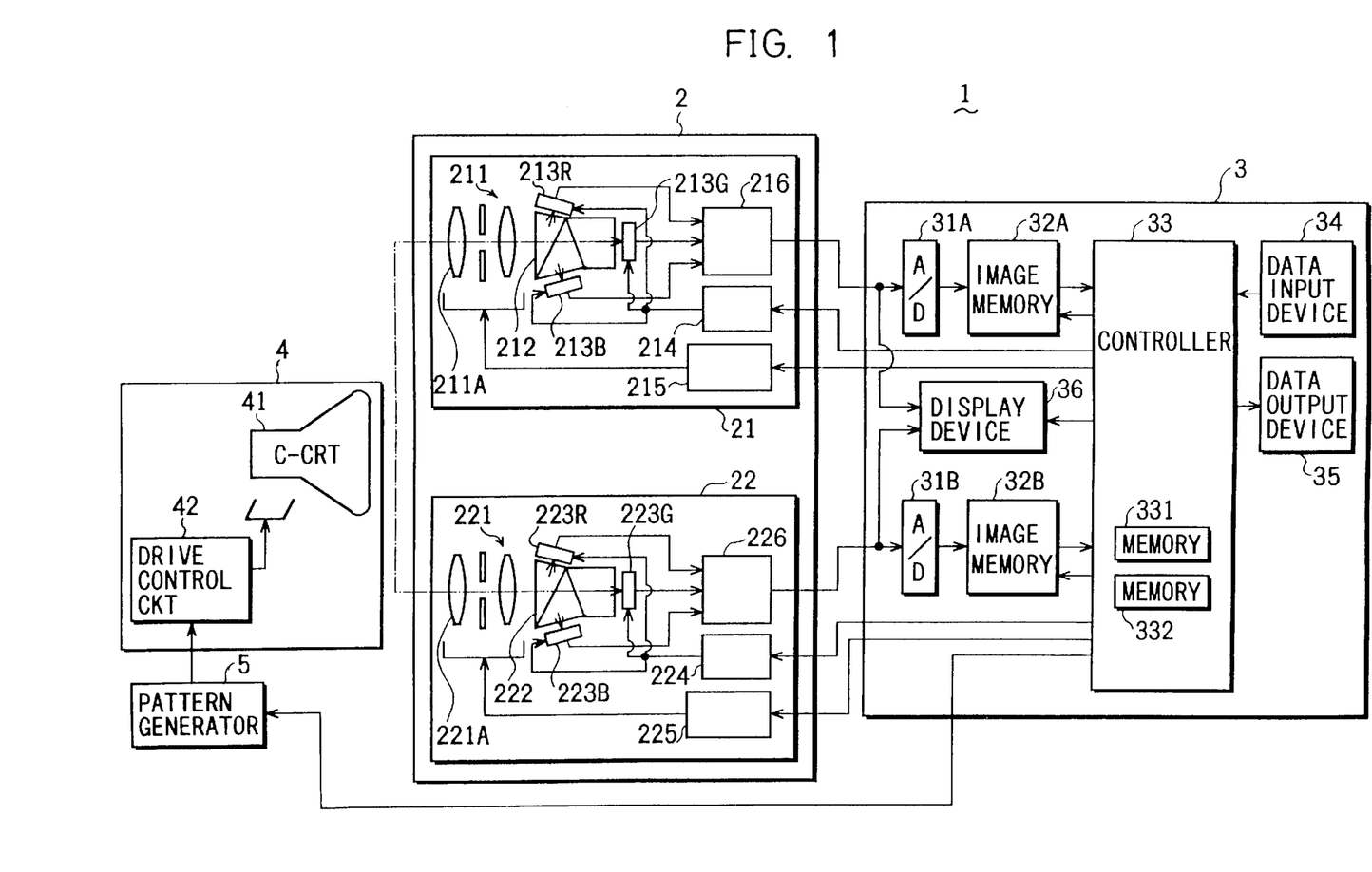
FIG. 1 is a schematic diagram showing a construction of a convergence measurement apparatus for a color CRT embodying the invention.

A convergence measurement apparatus for a color CRT embodying the invention will be described. FIG. 1 shows a schematic construction of a convergence measurement apparatus 1 for a color CRT. The convergence measurement apparatus 1 includes an image pickup unit 2 and a measuring unit 3.

The image pickup unit 2 picks up an image of a specified measurement pattern (e.g., crosshatched pattern, dot pattern, etc.) displayed on a display surface of a color display 4 to be measured and is provided with a pair of image pickup cameras 21, 22 so as to enable the sensing of images by a stereoscopic method.

The measuring unit 3 calculates a misconvergence amount of the color display 4 using the image data of the measurement pattern obtained by the image pickup unit 2 and displays the calculation result on a display device 36.

The image pickup camera 21 in the image pickup unit 2 is a color image pickup apparatus of three-plate type which is constructed such that a dichroic prism 212 for separating a light into rays of three colors is provided behind a taking lens 211, solid-state image sensing devices 213R, 213G, 213B including CCD area sensors are arranged in positions opposite to emergent surfaces of dichroic prism 212 from which the rays of the respective colors of R, G, B emerge. The image pickup camera 22 is also a color image pickup apparatus of three-plate type similar to the image pickup camera 21.

In the image pickup camera 21 are also provided an image pickup controller 214 for controlling the operations of the respective solid-state image sensing devices (hereinafter, "CCDs") 213R, 213G, 213B, a focusing circuit 215 for effecting an automatic focusing by driving the taking lens 211, and a signal processing circuit 216 for applying specified image processings to image signals sent from the CCDs 213R, 213G, 213B and outputting them to the measuring unit 3. Likewise, an image pickup controller 224, a focusing circuit 225 and a signal processing circuit 226 are provided in the image pickup camera 22.

The sensing controller 214 is controlled by a sensing control signal sent from the measurement apparatus 3 and controls the image pickup operations (electric charge storing operations) of the CCDs 213R, 213G, 213B in accordance with this sensing control signal. Likewise, the sensing controller 224 is controlled by a sensing control signal sent from the measurement apparatus 3 and controls the image pickup operations of the CCDs 223R, 223G, 223B in accordance with this sensing control signal.

The focusing control circuit 215 is controlled by a focusing control signal sent from the measurement apparatus 3 and drives a front group 211A of the taking lens 211 in accordance with this focusing control signal to focus a light image of the measurement pattern displayed on the display surface of the color display 4 on the sensing surfaces of the CCDs 213R, 213G, 213B. Likewise, the focusing control circuit 225 is controlled by a focusing control signal sent from the measurement apparatus 3 and drives a front group 221A of the taking lens 221 in accordance with this focusing control signal to focus the light image of the measurement pattern displayed on the display surface of the color display 4 on the sensing surfaces of the CCDs 223R, 223G, 223B.

The focusing control is performed, for example, according to a hill-climbing method in accordance with the focusing control signal from a controller 33. Specifically, in the case of, e.g. the image pickup camera 21, the controller 33 extracts, for example, high frequency components (edge portion of the measurement pattern) of the green image picked up by the CCD 213G and outputs such a focusing control signal to the focusing control circuit 215 as to maximize the high frequency components (make the edge of the measurement pattern more distinctive). The focusing control circuit 215 moves the front group 211A of the taking lens 211 forward and backward with respect to an in-focus position in accordance with the focusing control signal, thereby gradually decreasing a moving distance to finally set the taking lens 211 in the in-focus position.

The focusing control is performed using the picked image in this embodiment. However, the image pickup camera 21, 22 may, for example, be provided with distance sensors and the taking lenses 211, 221 may be driven using distance data between the cameras 21, 22 and the display surface of the color display 4 which are detected by the distance sensors.

The measurement apparatus 3 includes analog-to-digital (A/D) converters 31A, 31B, image memories 32A, 32B, the controller 33, a data input device 34, a data output device 35 and the display device 36.

The A/D converters 31A, 31B convert the image signal (analog signals) inputted from the image pickup cameras 21, 22 into image data in the form of digital signals. The image memories 32A, 32B store the image data outputted from the A/D converters 31A, 31B, respectively.

Each of the A/D converters 31A, 31B is provided with three A/D converting circuits in conformity with the image signals of the respective color components R, G, B. Each of the image memories 32A, 32B includes a memory of three frames in conformity with the image data of the respective color components R, G, B.

The controller 33 is an operation control circuit including a microcomputer and is provided with a memory 331 including a ROM (read only memory) and a memory 332 including a RAM (random access memory).

In the memory 331 are stored a program for the convergence measurement processing (including a series of operations including the driving of the optical system, the image pickup operation, the calculation of the image data) and data (correction values, a data conversion table, etc.) necessary for the calculation. Further, the memory 332 provides a data area and a work area for performing a variety of operations for the convergence measurement.

The misconvergence amount (measurement result) calculated by the controller 33 is stored in the memory 332 and outputted to the display device 36 to be displayed in a predetermined display format. The misconvergence amount can also be outputted to an equipment (printer or an external storage device) externally connected via the data output device 35.

The data input device 34 is operated to input a variety of data for the convergence measurement and includes, e.g. a keyboard. Via the data input device 34, data such as an arrangement interval of the pixels of the CCDs 213, 223 and a position of the measurement point on the display surface of the color display 4 are inputted.

The color display 4 to be measured includes a color CRT 41 displaying a video image and a drive control circuit 42 for controlling the drive of the color CRT 41. A video signal of a measurement pattern generated by a pattern generator 5 is inputted to the drive control circuit 42 of the color display 4, which in turn drives a deflection circuit of the color CRT 41 in accordance with this video signal, thereby causing, for example, a crosshatched measurement pattern as shown in FIG. 2 to be displayed on the display surface.

In this convergence measurement apparatus 1, images of the measurement pattern displayed on the color display 4 are stereoscopically picked up by the image pickup cameras 21, 22 of the image pickup unit 2 and a misconvergence amount is measured using the image data obtained by the image pickup cameras 21, 22.

Next, a method for measuring the misconvergence amount is described, taking as an example a case where a crosshatched pattern is used as a measurement pattern.

Figure 2:
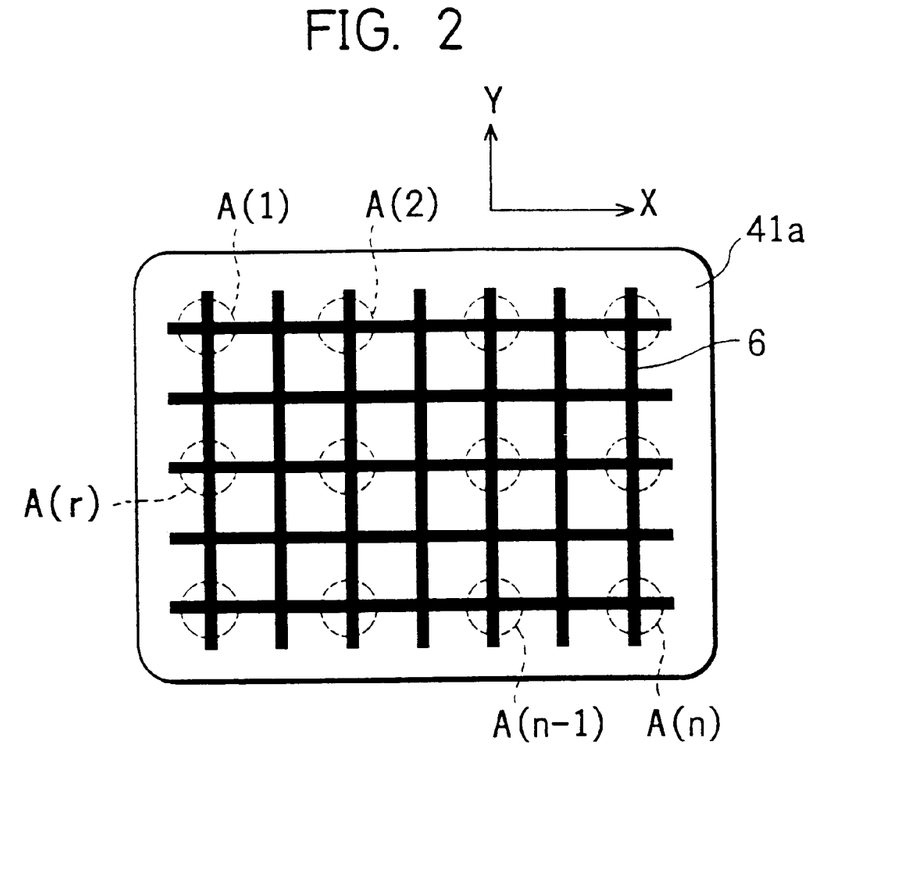
FIG. 2 is a diagram showing a crosshatched pattern displayed on a color CRT.

FIG. 2 is a diagram showing a crosshatched pattern 6 displayed on the color CRT 41. The crosshatched pattern 6 is formed by intersecting a plurality of vertical lines and a plurality of horizontal lines, and is displayed in a suitable size such that a plurality of intersections are included within a display surface 41a of the color CRT 41. Misconvergence amount measurement areas A(1) to A(n) are so set in desired positions within the display surface 41a as to include at least one intersection.

In each measurement area A(r) (r=1, 2, ... n), a horizontal (X-direction in XY coordinate systems) misconvergence amount $\Delta D_X$ is calculated based on a picked image of the vertical line included in this measurement area A(r), and a vertical (Y-direction in XY coordinate systems) misconvergence amount $\Delta D_Y$ is calculated based on a picked image of the horizontal line.

Figure 3:
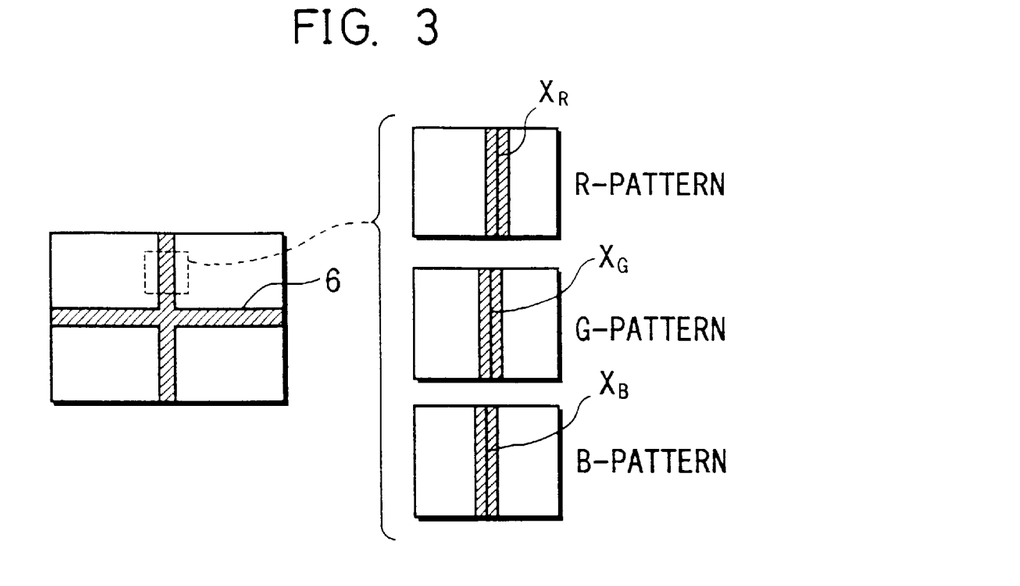
FIG. 3 is a diagram showing a vertical line included in a measurement area separated into lines of the respective color components of R, G, B.
Figure 4:
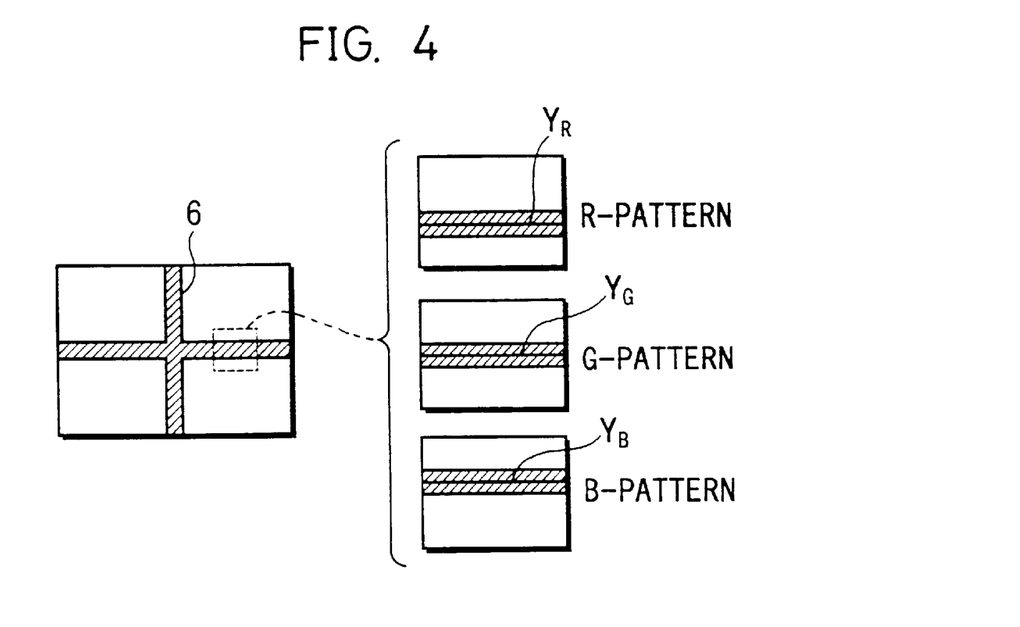
FIG. 4 is a diagram showing a horizontal line included in a measurement area separated into lines of the respective color components of R, G, B.

FIG. 3 is a diagram showing the vertical line included in the measurement area A(r) and separated into lines of the respective color components, and FIG. 4 is a diagram showing the horizontal line included in the measurement area A(r) and separated into lines of the respective color components.

Assuming that $X_R$, $X_G$, $X_B$ denote luminous positions (luminance center positions) of the vertical lines of R, G, B along X-direction on the display surface 41a of the color CRT 41, respectively, the horizontal misconvergence amount $\Delta D_X$ is expressed as displacements $\Delta D_{RGX}(=X_R-X_G)$, $\Delta D_{BGX}(=X_B-X_G)$ of the luminous positions with respect to any of the luminous positions $X_R$, $X_G$, $X_B$, e.g. the luminous position $X_G$ of the color component G.

Further, assuming that $Y_R$, $Y_G$, $Y_B$ denote luminous positions (luminance center positions) of the horizontal lines of R, G, B along Y-direction on the display surface 41a of the color CRT 41, respectively, the vertical misconvergence amount $\Delta D_Y$ is expressed as displacements $\Delta D_{RGY}(=Y_R-Y_G)$, $\Delta D_{BGY}(=Y_B-Y_G)$ of the luminous positions with respect to any of the luminous positions $Y_R$, $Y_G$, $Y_B$, e.g. the luminous position $Y_G$ of the color component G.

Next, a specific method for calculating the misconvergence amount is described taking an example a case where the image of the measurement pattern is picked up according to a stereoscopic method.

In order to facilitate the description, the color components at the light emitting side of the color display 4 are written in capital letters of R(red), G(green), B(blue) and those at the light receiving side of the image pickup unit 2 are written in small letters of r(red), g(green), b(blue).

First, the coordinate systems of the convergence measuring system is described. It is assumed that the image pickup unit 2 be arranged in front of the color display 4 as shown in FIG. 5 in order to pick up the image of the measurement pattern displayed on the display surface 41a of the color display 4.

Figure 5:
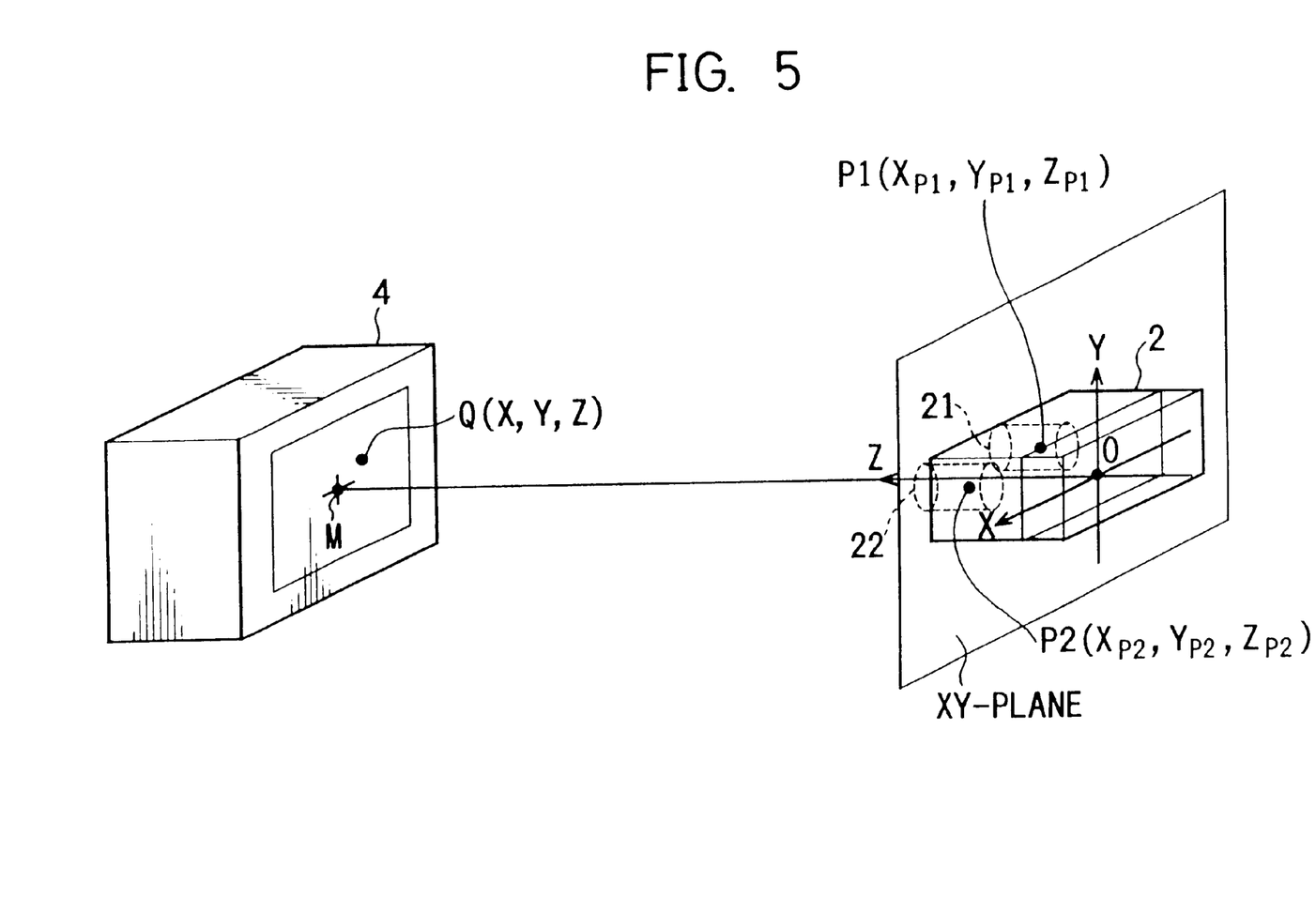
FIG. 5 is a perspective view showing an arrangement of a color display apparatus and an image pickup unit in a convergence measurement by a stereoscopic method.

In FIG. 5, XYZ coordinate systems of the convergence measuring system which have an origin O in an arbitrary position on a normal line passing a center M of the display surface 41a of the color display 4 are set such that Z-axis is parallel to this normal line, Y-axis is parallel to the vertical direction of the display surface 41a, and X-axis is parallel to the horizontal direction of the display surface 41a. It should be noted that (+)-directions of Z-axis, Y-axis and X-axis are a direction from the origin O toward the center M, an upward direction from the origin O and a leftward direction from the origin O when the color display 4 is viewed from the origin O, respectively.

$Q_J(X_J, Y_J, Z_J)$ denotes coordinates of the luminous center (luminance center position) of a phosphor of a color component J (J=R, G, B) at a measurement point Q (e.g., a cross point in a crosshatched pattern or a dot point in a dotted pattern) on the display surface 41a of the color display 4, and P1($X_{P1}$, $Y_{P1}$, $Z_{P1}$), P2($X_{P2}$, $Y_{P2}$, $Z_{P2}$) denote the positions or coordinates of principal points P1, P2 of the taking lenses 211, 221 of the image pickup unit 2.

Figure 6:
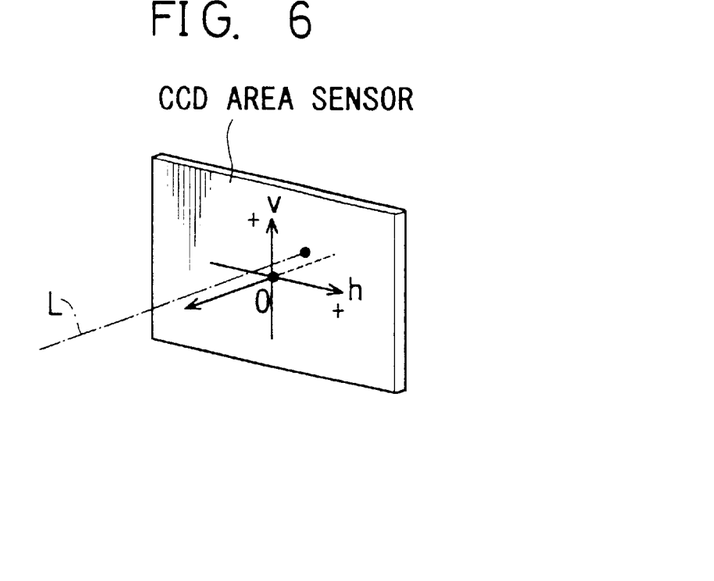
FIG. 6 is a perspective view showing hv coordinate systems defined on a sensing surface of the CCD area sensor.

Further, hv coordinate systems having an origin o in the center of the sensing surface of each of the CCDs 213R, 213G, 213B, 223R, 223G, 223B is set as shown in FIG. 6 such that h-axis is parallel to the vertical direction of the CCD area sensor and v-axis is parallel to the horizontal direction of the CCD area sensor. It should be noted that (+)-directions of v-axis and h-axis are an upward direction and a rightward direction, when facing the sensing surface, from the origin o.

Figure 7:
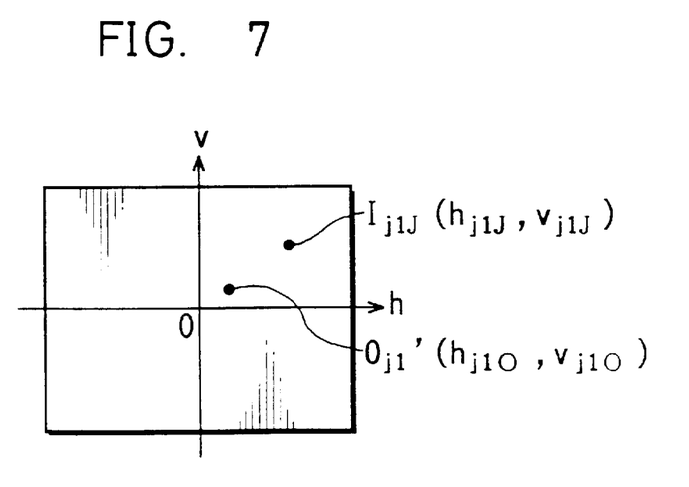
FIG. 7 is a diagram showing coordinates of an optical axis and a focusing point on the sensing surface of the CCD area sensor.

It is assumed that each sensing surface is in such a position that an optical axis $L_J$(J=R, G, B) for each color component J is incident in a position displaced from the origin o of the hv coordinate systems on its sensing surface. In this case, coordinates of an incidence point $o_{j1'}$ of an optical axis $L_{J1}$ on the sensing surface of the CCD of the color component j (j=r, g, b) of the image pickup camera 21 and coordinates of an incidence point $o_{j2'}$ of an optical axis $L_{J2}$ on the sensing surface of the CCD of the color component j of the image pickup camera 22 are expressed as ($h_{j1O}$, $v_{j1O}$), ($h_{j2O}$, $v_{j2O}$), respectively, as shown in FIG. 7. Further, coordinates of a focusing point $I_{j1J}$ of a light image at the measurement point $Q_J$ of the display surface 41a on the sensing surface of the CCD of the color component j of the image pickup camera 21 and coordinates of a focusing point $I_{j2J}$ thereof on the sensing surface of the CCD of the color component j of the image pickup camera 22 are expressed as ($h_{j1J}$, $v_{j1J}$), ($h_{j2J}$, $v_{j2J}$), respectively.

Assuming that a, b, f denote a distance from a principal point of a lens to an object, a distance therefrom to an image and a focal length of the lens, there is, in general, a relationship between them: $1/a + 1/b = 1/f$. If y, y' are sizes of the object and the image, respectively, there is a relationship between them: y'/y=b/a. The following relationship (1) is obtained from the above relationships:

$$y' = y \cdot f/(a-f) \qquad (1)$$

By applying Equation (1) to the aforementioned positional relationship of the measurement point $Q_J$ and the focusing points $I_{j1J}$, $I_{j2J}$, Equations (2) to (5) can be obtained.

$$h_{j1J} = h_{j1J} - h_{j1O} = (X_J - X_{P1}) \cdot f_{j1J}/(Z_J - f_{j1J}) \qquad (2)$$

$$v_{j1J} = v_{j1J} - v_{j1O} = (Y_J - Y_{P1}) \cdot f_{j1J}/(Z_J - f_{j1J}) \qquad (3)$$

where $f_{j1J}$ denotes a focal length of the optical system for the color component j of the image pickup camera 21 with respect to the emission of phosphors of the color J on the display surface 4a.

$$h_{j2J} = h_{j2J} - h_{j2O} = (X_J - X_{P2}) \cdot f_{j2J}/(Z_J - f_{j2J}) \qquad (4)$$

$$v_{j2J} = v_{j2J} - v_{j2O} = (Y_J - Y_{P2}) \cdot f_{j2J}/(Z_J - f_{j2J}) \qquad (5)$$

where $f_{j2J}$ denotes a focal length of the optical system for the color component j of the image pickup camera 22 with respect to the emission of phosphors of the color J on the display surface 4a.

Next, a method for calculating a misconvergence amount according to the stereoscopic method is described.

In order to facilitate the description, a case where the image pickup unit 2 is arranged such that the optical axes L1, L2 of the image pickup cameras 21, 22 are located in XZ-plane is described.

If the principal points P1, P2 are located in XZ-plane, the coordinates thereof are:

$$P1(X_{P1}, 0, Z_{P1}),$$

$$P2(X_{P2}, 0, Z_{P2})$$

since Y-coordinate is "0".

Equations (6), (7) correspond to Equations (2), (3) with respect to the light image at the measurement point $Q_J$ of the color display 4 and the focusing point $I_{j1J}$ on the image pickup camera 21.

$$h_{j1J} = h_{j1J} - h_{j1O} = (X_J - X_{P1}) \cdot f_{j1J}/(Z_J - f_{j1J}) \qquad (6)$$

$$v_{j1J} = v_{j1J} - v_{j1O} = Y_J \cdot f_{j1J}/(Z_J - f_{j1J}) \qquad (7)$$

When hv coordinates of the focusing points $I_{r1J}$, $I_{g1J}$, $I_{b1J}$ on the respective sensing surfaces of the CCDs 213R, 213G, 213B are calculated by replacing j of Equations (6), (7) by the color components r, g, b, Equations (8) to (13) can be obtained.

$$h_{r1J} = (X_J - X_{P1}) \cdot f_{r1J}/(Z_J - f_{r1J}) \qquad (8)$$

$$v_{r1J} = Y_J \cdot f_{r1J}/(Z_J - f_{r1J}) \qquad (9)$$

$$h_{g1J} = (X_J - X_{P1}) \cdot f_{g1J}/(Z_J - f_{g1J}) \qquad (10)$$

$$v_{g1J} = Y_J \cdot f_{g1J}/(Z_J - f_{g1J}) \qquad (11)$$

$$h_{b1J} = (X_J - X_{P1}) \cdot f_{b1J}/(Z_J - f_{b1J}) \qquad (12)$$

$$v_{b1J} = Y_J \cdot f_{b1J}/(Z_J - f_{b1J}) \qquad (13)$$

Further, Equations (14), (15) correspond to Equations (2), (3) with respect to the light image at the measurement point $Q_J$ of the color display 4 and the focusing point $I_{j2J}$ on the image pickup camera 22.

$$h_{j2J} = (X_J - X_{P2}) \cdot f_{j2J}/(Z_J - f_{j2J}) \qquad (14)$$

$$v_{j2J} = Y_J \cdot f_{j2J}/(Z_J - f_{j2J}) \qquad (15)$$

When hv coordinates of the focusing points $I_{r2J}$, $I_{g2J}$, $I_{b2J}$ on the respective sensing surfaces of the CCDs 223R, 223G, 223B are calculated by replacing j of Equations (14), (15) by the color components r, g, b, Equations (16) to (21) can be obtained.

$$h_{r2J} = (X_J - X_{P2}) \cdot f_{r2J}/(Z_J - f_{r2J}) \qquad (16)$$

$$v_{r2J} = Y_J \cdot f_{r2J}/(Z_J - f_{r2J}) \qquad (17)$$

$$h_{g2J} = (X_J - X_{P2}) \cdot f_{g2J}/(Z_J - f_{g2J}) \qquad (18)$$

$$v_{g2J} = Y_J \cdot f_{g2J}/(Z_J - f_{g2J}) \qquad (19)$$

$$h_{b2J} = (X_J - X_{P2}) \cdot f_{b2J}/(Z_J - f_{b2J}) \qquad (20)$$

$$v_{b2J} = Y_J \cdot f_{b2J}/(Z_J - f_{b2J}) \qquad (21)$$

The coordinate $X_J$ is calculated as in Equation (22) by eliminating $f_{r1J}/(Z_J - f_{r1J})$, $f_{r2J}/(Z_J - f_{r2J})$ and $Y_J$ from Equations (8), (9), (16), (17).

$$X_J = (v_{r1J} \cdot h_{r2J} \cdot X_{P1} - v_{r2J} \cdot h_{r1J} \cdot X_{P2})/(v_{r1J} \cdot h_{r2J} - v_{r2J} \cdot h_{r1J}) \qquad (22)$$

Further, the coordinate $Y_J$ is calculated as in Equation (23) by eliminating $f_{r1J}/(Z_J - f_{r1J})$ from Equations (8), (9) and replacing $X_J$ by Equation (22).

$$Y_J = v_{r1J} \cdot v_{r2J} \cdot (X_{P1} - X_{P2})/(v_{r1J} \cdot h_{r2J} - v_{r2J} \cdot h_{r1J}) \qquad (23)$$

If Equation (23) is put into Equation (9) or (17), the coordinate $Z_J$ is calculated as in Equation (24) or (25).

$$Z_J = f_{r1J} + \{f_{r1J} \cdot v_{r2J} \cdot (X_{P1} - X_{P2})/(v_{r1J} \cdot h_{r2J} - v_{r2J} \cdot h_{r1J})\} \quad (24)$$

$$= f_{r2J} + \{f_{r2J} \cdot v_{r1J} \cdot (X_{P1} - X_{P2})/(v_{r1J} \cdot h_{r2J} - v_{r2J} \cdot r_{r1J})\} \quad (25)$$

Equations (22) to (25) are Equations for calculating the XYZ coordinates of the measurement point $Q_J$ on the display surface 41*a* from the red component images picked by the image pickup cameras 21, 22. Accordingly, if the calculations similar to the above are performed using Equations (10), (11), (18), (19), there can be obtained Equations for calculating the XYZ coordinates of the measurement point $Q_J$ on the display surface 41*a* from the green component images picked by the image pickup cameras 21, 22. Further, if the calculations similar to the above are performed using Equations (12), (13), (20), (21), there can be obtained Equations for calculating the XYZ coordinates of the measurement point $Q_J$ on the display surface 41*a* from the blue component images picked by the image pickup cameras 21, 22.

Assuming that the measurement points on the display surface 41*a* calculated from the picked images of r, g, b of the image pickup unit 2 are $Q_{Jr}$, $Q_{Jg}$, $Q_{Jb}$ and these XYZ coordinates, are $Q_{Jr}(X_{Jr}, Y_{Jr}, Z_{Jr})$, $Q_{Jg}(X_{Jg}, Y_{Jg}, Z_{Jg})$, $Q_{Jb}(X_{Jb}, Y_{Jb}, Z_{Jb})$, the respective XYZ coordinates of the measurement points $Q_{Jr}$, $Q_{Jg}$, $Q_{Jb}$ are calculated in accordance with Equations (26) to (37):

$$X_{Jr} = (v_{r1J} \cdot h_{r2J} \cdot X_{P1} - v_{r2J} \cdot h_{r1J} \cdot X_{P2})/(v_{r1J} \cdot h_{r2J} - v_{r2J} \cdot h_{r1J}) \quad (26)$$

$$Y_{Jr} = v_{r1J} \cdot v_{r2J} \cdot (X_{P1} - X_{P2})/(v_{r1J} \cdot h_{r2J} - v_{r2J} \cdot h_{r1J}) \quad (27)$$

$$Z_{Jr} = f_{r1J} + \{f_{r1J} \cdot v_{r2J} \cdot (X_{P1} - X_{P2})/(v_{r1J} \cdot h_{r2J} - v_{r2J} \cdot h_{r1J})\} \quad (28)$$

$$= f_{r2J} + \{f_{r2J} \cdot v_{r1J} \cdot (X_{P1} - X_{P2})/(v_{r1J} \cdot h_{r2J} - v_{r2J} \cdot h_{r1J})\} \quad (29)$$

$$X_{Jg} = (v_{g1J} \cdot h_{g2J} \cdot X_{P1} - v_{g2J} \cdot h_{g1J} \cdot X_{P2})/(v_{g1J} \cdot h_{g2J} - v_{g2J} \cdot h_{g1J}) \quad (30)$$

$$Y_{Jg} = v_{g1J} \cdot v_{g2J} \cdot (X_{P1} - X_{P2})/(v_{g1J} \cdot h_{g2J} - v_{g2J} \cdot h_{g1J}) \quad (31)$$

$$Z_{Jg} = f_{g1J} + \{f_{g1J} \cdot v_{g2J} \cdot (X_{P1} - X_{P2})/(v_{g1J} \cdot h_{g2J} - v_{g2J} \cdot h_{g1J})\} \quad (32)$$

$$= f_{g2J} + \{f_{g2J} \cdot v_{g1J} \cdot (X_{P1} - X_{P2})/(v_{g1J} \cdot h_{g2J} - v_{g2J} \cdot h_{g1J})\} \quad (33)$$

$$X_{Jb} = (v_{b1J} \cdot h_{b2J} \cdot X_{P1} - v_{b2J} \cdot h_{b1J} \cdot X_{P2})/(v_{b1J} \cdot h_{b2J} - v_{b2J} \cdot h_{b1J}) \quad (34)$$

$$Y_{Jb} = v_{b1J} \cdot v_{b2J} \cdot (X_{P1} - X_{P2})/(v_{b1J} \cdot h_{b2J} - v_{b2J} \cdot h_{b1J}) \quad (35)$$

$$Z_{Jb} = f_{b1J} + \{f_{b1J} \cdot v_{b2J} \cdot (X_{P1} - X_{P2})/(v_{b1J} \cdot h_{b2J} - v_{b2J} \cdot h_{b1J})\} \quad (36)$$

$$= f_{b2J} + \{f_{b2J} \cdot v_{b1J} \cdot (X_{P1} - X_{P2})/(v_{b1J} \cdot h_{b2J} - v_{b2J} \cdot h_{b1J})\} \quad (37)$$

As described above, with respect to, e.g., the measurement point $Q_R$ of the red phosphor on the display surface 41*a*, *three measurement points* $Q_{Rr}$, $Q_{Rg}$, $Q_{Rb}$ are calculated for every image of the respective color components r, g, b obtained by the image pickup unit 2. Accordingly, if the measurement value of the measurement point $Q_R$ is determined by weighted average values of $Q_{Rr}$, $Q_{Rg}$, $Q_{Rb}$ calculated for every image of the respective color components r, g, b, the XYZ coordinates of the measurement point $Q_R$ are calculated in accordance with Equations (38) to (41):

$$X_R = W_{rR}\{(v_{r1R} \cdot h_{r2R} \cdot X_{P1} - v_{r2R} \cdot h_{r1R} \cdot X_{P2})/$$

$$(v_{r1R} \cdot h_{r2R} - v_{r2R} \cdot h_{r1R})\}$$

$$+ W_{gR}\{(v_{g1R} \cdot h_{g2R} \cdot X_{P1} - v_{r2R} \cdot h_{g1R} \cdot X_{P2})/$$

$$(v_{g1R} \cdot h_{g2R} - v_{g2R} \cdot h_{g1R})\}$$

$$+ W_{bR}\{(v_{b1R} \cdot h_{b2R} \cdot X_{P1} - v_{r2R} \cdot h_{b1R} \cdot X_{P2})/$$

$$(v_{b1R} \cdot h_{b2R} - v_{b2R} \cdot h_{b1R})\} \quad (38)$$

$$Y_R = W_{rR}\{v_{r1R} - v_{r2R} \cdot (X_{P1} - X_{P2})/(v_{r1R} \cdot h_{r2R} - v_{r2R} \cdot h_{r1R})\}$$

$$+ W_{gR}\{v_{g1R} - v_{g2R} \cdot (X_{P1} - X_{P2})/(v_{g1R} \cdot h_{g2R} - v_{g2R} \cdot h_{g1R})\}$$

$$+ W_{bR}\{v_{b1R} - v_{b2R} \cdot (X_{P1} - X_{P2})/(v_{b1R} \cdot h_{b2R} - v_{b2R} \cdot h_{b1R})\} \quad (39)$$

$$Z_R = W_{rR}[f_{r1R} + \{f_{r1R} \cdot v_{r2R} \cdot (X_{P1} - X_{P2})/$$

$$(v_{r1R} \cdot h_{r2R} - v_{r2R} \cdot h_{r1R})\}] + W_{gR}[f_{g1R} + \{f_{g1R} \cdot v_{g2R} \cdot (X_{P1} - X_{P2})/$$

$$(v_{g1R} \cdot h_{g2R} - v_{g2R} \cdot h_{g1R})\}] + W_{bR}[f_{b1R} + \{f_{b1R} \cdot v_{b2R} \cdot (X_{P1} - X_{P2})/$$

$$(v_{b1R} \cdot h_{b2R} - v_{b2R} \cdot h_{b1R})\}] \quad (40)$$

$$= W_{rR}[f_{r2R} + \{f_{r2R} \cdot v_{r1R} \cdot (X_{P1} - X_{P2})/$$

$$(v_{r1R} \cdot h_{r2R} - v_{r2R} \cdot h_{r1R})\}] + W_{gR}[f_{g2R} + \{f_{g2R} \cdot v_{g1R} \cdot (X_{P1} - X_{P2})/$$

$$(v_{g1R} \cdot h_{g2R} - v_{g2R} \cdot h_{g1R})\}] + W_{bR}[f_{b2R} + \{f_{b2R} \cdot v_{b1R} \cdot (X_{P1} - X_{P2})/$$

$$(v_{b1R} \cdot h_{b2R} - v_{b2R} \cdot h_{b1R})\}] \quad (41)$$

where $W_{rR}$, $W_{gR}$, $W_{bR}$ are weight factors.

Likewise, if the measurement value of the measurement point $Q_G$ is determined by weighted average values of $Q_{Gr}$, $Q_{Gg}$, $Q_{Gb}$ calculated for every image of the respective color components r, g, b, the XYZ coordinates of the measurement point $Q_G$ are calculated in accordance with Equations (42) to (45). Further, if the measurement value of the measurement point $Q_B$ is determined by weighted average values of $Q_{Br}$, $Q_{Bg}$, $Q_{Bb}$ calculated for every image of the respective color components r, g, b, the XYZ coordinates of the measurement point $Q_B$ are calculated in accordance with Equations (46) to (49).

$$X_G = W_{rG}\{(v_{r1G} \cdot h_{r2G} \cdot X_{P1} - v_{r2G} \cdot h_{r1G} \cdot X_{P2})/$$

$$(v_{r1G} \cdot h_{r2G} - v_{r2G} \cdot h_{r1G})\} + W_{gG}\{(v_{g1G} \cdot h_{g2G} \cdot X_{P1} - v_{g2G} \cdot h_{g1G} \cdot X_{P2})/$$

$$(v_{g1G} \cdot h_{g2G} - v_{g2G} \cdot h_{g1G})\}$$

$$+ W_{bG}\{(v_{b1G} \cdot h_{b2G} \cdot X_{P1} - v_{b2G} \cdot h_{b1G} \cdot X_{P2})/$$

$$(v_{b1G} \cdot h_{b2G} - v_{b2G} \cdot h_{b1G})\} \quad (42)$$

$$Y_G = W_{rG}\{v_{r1G} \cdot v_{r2G} \cdot (X_{P1} - X_{P2})/$$

$$(v_{r1G} \cdot h_{r2G} - v_{r2G} \cdot h_{r1G})\}$$

$$+ W_{gG}\{v_{g1G} \cdot v_{g2G} \cdot (X_{P1} - X_{P2})/$$

$$(v_{g1G} \cdot h_{g2G} - v_{g2G} \cdot h_{g1G})\}$$

$$+ W_{bG}\{v_{b1G} \cdot v_{b2G} \cdot (X_{P1} - X_{P2})/$$

$$(v_{b1G} \cdot h_{b2G} - v_{b2G} \cdot h_{b1G})\} \quad (43)$$

$$Z_G = W_{rG}[f_{r1G} + \{f_{r1G} \cdot v_{r2G} \cdot (X_{P1} - X_{P2})/$$

$$(v_{r1G} \cdot h_{r2G} - v_{r2G} \cdot h_{r1G})\}]$$

$$+ W_{gG}[f_{g1G} + \{f_{g1G} \cdot v_{g2G} \cdot (X_{P1} - X_{P2})/$$

$$(v_{g1G} \cdot h_{g2G} - v_{g2G} \cdot h_{g1G})\}]$$

$$+ W_{bG}[f_{b1G} + \{f_{b1G} \cdot v_{b2G} \cdot (X_{P1} - X_{P2})/$$

$$(v_{b1G} \cdot h_{b2G} - v_{b2G} \cdot h_{b1G})\}] \quad (44)$$

$$= W_{rG}[f_{r2G} + \{f_{r2G} \cdot v_{r1G} \cdot (X_{P1} - X_{P2})/$$

$$(v_{r1G} \cdot h_{r2G} - v_{r2G} \cdot h_{r1G})\}]$$

$$+ W_{gG}[f_{g2G} + \{f_{g2G} \cdot v_{g1G} \cdot (X_{P1} - X_{P2})/$$

$$(v_{g1G} \cdot h_{g2G} - v_{g2G} \cdot h_{g1G})\}]$$

$$+W_{bG}[f_{b2G}+\{f_{b2G}\cdot v_{b1G'}\cdot(X_{P1}-X_{P2})/$$
$$(v_{b1G'}\cdot h_{b2G'}-v_{b2G'}\cdot h_{b1G'})\}] \qquad (45)$$

where $W_{rG}$, $W_{gG}$, $W_{bG}$ are weight factors.

$$X_B=W_{rB}\{(v_{r1B'}\cdot h_{r2B'}\cdot X_{P1}-v_{r2B'}\cdot h_{r1B'}\cdot X_{P2})/$$
$$(v_{r1B'}\cdot h_{r2B'}-v_{r2B'}\cdot h_{r1B'})\}$$
$$+W_{gB}\{(v_{g1B'}\cdot h_{g2B'}\cdot X_{P1}-v_{g2B'}\cdot h_{g1B'}\cdot X_{P2})/$$
$$(v_{g1B'}\cdot h_{g2B'}-v_{g2B'}\cdot h_{g1B'})\}$$
$$+W_{bB}\{(v_{b1B'}\cdot h_{b2B'}\cdot X_{P1}-v_{b2B'}\cdot h_{b1B'}\cdot X_{P2})/$$
$$(v_{b1B'}\cdot h_{b2B'}-v_{b2B'}\cdot h_{b1B'})\} \qquad (46)$$

$$Y_B=W_{rB}\{v_{r1B'}\cdot v_{r2B'}\cdot(X_{P1}-X_{P2})/$$
$$(v_{r1B'}\cdot h_{r2B'}-v_{r2B'}\cdot h_{r1B'})\}$$
$$+W_{gB}\{v_{g1B'}\cdot v_{g2B'}\cdot(X_{P1}-X_{P2})/$$
$$(v_{g1B'}\cdot h_{g2B'}-v_{g2B'}\cdot h_{g1B'})\}$$
$$+W_{bB}\{v_{b1B'}\cdot v_{b2B'}\cdot(X_{P1}-X_{P2})/$$
$$(v_{b1B'}\cdot h_{b2B'}-v_{b2B'}\cdot h_{b1B'})\} \qquad (47)$$

$$Z_B=W_{rB}[f_{r1B}+\{f_{r1B}\cdot v_{r2B'}\cdot(X_{P1}-X_{P2})/$$
$$(v_{r1B'}\cdot h_{r2B'}-v_{r2B'}\cdot h_{r1B'})\}]$$
$$+W_{gB}[f_{g1B}+\{f_{g1B}\cdot v_{g2B'}\cdot(X_{P1}-X_{P2})/$$
$$(v_{g1B'}\cdot h_{g2B'}-v_{g2B'}\cdot h_{g1B'})\}]$$
$$+W_{bB}[f_{b1B}+\{f_{b1B}\cdot v_{b2B'}\cdot(X_{P1}-X_{P2})/$$
$$(v_{b1B'}\cdot h_{b2B'}-v_{b2B'}\cdot h_{b1B'})\}] \qquad (48)$$

$$=W_{rB}[f_{r2B}+\{f_{r2B}\cdot v_{r1B'}\cdot(X_{P1}-X_{P2})/$$
$$(v_{r1B'}\cdot h_{r2B'}-v_{r2B'}\cdot h_{r1B'})\}]$$
$$+W_{gB}[f_{g2B}+\{f_{g2B}\cdot v_{g1B'}\cdot(X_{P1}-X_{P2})/$$
$$(v_{g1B'}\cdot h_{g2B'}-v_{g2B'}\cdot h_{g1B'})\}]$$
$$+W_{bB}[f_{b2B}+\{f_{b2B}\cdot v_{b1B'}\cdot(X_{P1}-X_{P2})/$$
$$(v_{b1B'}\cdot h_{b2B'}-v_{b2B'}\cdot h_{b1B'})\}] \qquad (49)$$

where $W_{rB}$, $W_{gB}$, $W_{bB}$ are weight factors.

Accordingly, if Equations (38), (42), (46) are put into the aforementioned misconvergence amounts $\Delta D_{RGX}(=X_R-X_G)$, $\Delta D_{BGX}(=X_B-X_G)$, Equations for calculating the horizontal misconvergence amounts $\Delta D_{RGX}$, $\Delta D_{BGX}$ are defined as in Equations (50), (51):

$$\Delta D_{RGX}=X_R-X_G=[W_{rR}\{(v_{r1R'}\cdot h_{r2R'}\cdot X_{P1}-v_{r2R'}\cdot h_{r1R'}\cdot X_{P2})/$$
$$(v_{r1R'}\cdot h_{r2R'}-v_{r2R'}\cdot h_{r1R'})\}$$
$$+W_{gR}\{(v_{g1R'}\cdot h_{g2R'}\cdot X_{P1}-v_{g2R'}\cdot h_{g1R'}\cdot X_{P2})/$$
$$(v_{g1R'}\cdot h_{g2R'}-v_{g2R'}\cdot h_{g1R'})\}$$
$$+W_{bR}\{(v_{b1R'}\cdot h_{b2R'}\cdot X_{P1}-v_{b2R'}\cdot h_{b1R'}\cdot X_{P2})/$$
$$(v_{b1R'}\cdot h_{b2R'}-v_{b2R'}\cdot h_{b1R'})\}]$$
$$-[W_{rG}\{(v_{r1G'}\cdot h_{r2G'}\cdot X_{P1}-v_{r2R'}\cdot h_{r1G'}\cdot X_{P2})/$$
$$(v_{r1R'}\cdot h_{r2R'}-v_{r2R'}\cdot h_{r1R'})\}$$
$$+W_{gG}\{(v_{g1G'}\cdot h_{g2G'}\cdot X_{P1}-v_{g2R'}\cdot h_{g1G'}\cdot X_{P2})/$$
$$(v_{g1G'}\cdot h_{g2G'}-v_{g2G'}\cdot h_{g1G'})\}$$
$$+W_{bG}\{(v_{b1G'}\cdot h_{b2G'}\cdot X_{P1}-v_{b2G'}\cdot h_{b1G'}\cdot X_{P2})/$$
$$(v_{b1G'}\cdot h_{b2G'}-v_{b2G'}\cdot h_{b1G'})\}] \qquad (50)$$

$$\Delta D_{BGX}=X_B-X_G=[W_{rB}\{(v_{r1B'}\cdot h_{r2B'}\cdot X_{P1}-v_{r2B'}\cdot h_{r1B'}\cdot X_{P2})/$$
$$(v_{r1B'}\cdot h_{r2B'}-v_{r2B'}\cdot h_{r1B'})\}$$
$$+W_{gB}\{(v_{g1B'}\cdot h_{g2B'}\cdot X_{P1}-v_{g2B'}\cdot h_{g1B'}\cdot X_{P2})/$$
$$(v_{g1B'}\cdot h_{g2B'}-v_{g2B'}\cdot h_{g1B'})\}$$
$$+W_{bB}\{(v_{b1B'}\cdot h_{b2B'}\cdot X_{P1}-v_{b2B'}\cdot h_{b1B'}\cdot X_{P2})/$$
$$(v_{b1B'}\cdot h_{b2B'}-v_{b2B'}\cdot h_{b1B'})\}]$$
$$-[W_{rG}\{(v_{r1G'}\cdot h_{r2G'}\cdot X_{P1}-v_{r2R'}\cdot h_{r1G'}\cdot X_{P2})/$$
$$(v_{r1G'}\cdot h_{r2G'}-v_{r2G'}\cdot h_{r1G'})\}$$
$$+W_{gG}\{(v_{g1G'}\cdot h_{g2G'}\cdot X_{P1}-v_{g2R'}\cdot h_{g1G'}\cdot X_{P2})/$$
$$(v_{g1G'}\cdot h_{g2G'}-v_{g2G'}\cdot h_{g1G'})\}$$
$$+W_{bG}\{(v_{b1G'}\cdot h_{b2G'}\cdot X_{P1}-v_{b2G'}\cdot h_{b1G'}\cdot X_{P2})/$$
$$(v_{b1G'}\cdot h_{b2G'}-v_{b2G'}\cdot h_{b1G'})\}] \qquad (51)$$

Further, if Equations (39), (43), (47) are put into the aforementioned misconvergence amounts $\Delta D_{RGY}(=Y_R-Y_G)$, $\Delta D_{BGY}(=Y_B-Y_G)$, Equations for calculating the vertical misconvergence amounts $\Delta D_{RGY}$, $\Delta D_{BGY}$ are defined as in Equations (52), (53):

$$\Delta D_{RGY}=Y_R-Y_G$$
$$=[W_{rR}\{v_{r1R'}\cdot v_{r2R'}\cdot(X_{P1}-X_{P2})/$$
$$(v_{r1R'}\cdot h_{r2R'}-v_{r2R'}\cdot h_{r1R'})\}$$
$$+W_{gR}\{v_{g1R'}\cdot v_{g2R'}\cdot(X_{P1}-X_{P2})/$$
$$(v_{g1R'}\cdot h_{g2R'}-v_{g2R'}\cdot h_{g1R'})\}$$
$$+W_{bR}\{v_{b1R'}\cdot v_{b2R'}\cdot(X_{P1}-X_{P2})/$$
$$(v_{b1R'}\cdot h_{b2R'}-v_{b2R'}\cdot h_{b1R'})\}]$$
$$-[W_{rG}\{v_{r1G'}\cdot v_{r2G'}\cdot(X_{P1}-X_{P2})/$$
$$(v_{r1G'}\cdot h_{r2G'}-v_{r2G'}\cdot h_{r1G'})\}$$
$$+W_{gG}\{v_{g1G'}\cdot v_{g2G'}\cdot(X_{P1}-X_{P2})/$$
$$(v_{g1G'}\cdot h_{g2G'}-v_{g2G'}\cdot h_{g1G'})\}$$
$$+W_{bG}\{v_{b1G'}\cdot v_{b2G'}\cdot(X_{P1}-X_{P2})/$$
$$(v_{b1G'}\cdot h_{b2G'}-v_{b2G'}\cdot h_{b1G'})\}] \qquad (52)$$

$$\Delta D_{BGY}=Y_B-Y_G=[W_{rB}\{v_{r1B'}\cdot v_{r2B'}\cdot(X_{P1}-X_{P2})/$$
$$(v_{r1B'}\cdot h_{r2B'}-v_{r2B'}\cdot h_{r1B'})\}$$
$$+W_{gB}\{v_{g1B'}\cdot v_{g2B'}\cdot(X_{P1}-X_{P2})/$$
$$(v_{g1B'}\cdot h_{g2B'}-v_{g2B'}\cdot h_{g1B'})\}$$
$$+W_{bB}\{v_{b1B'}\cdot v_{b2B'}\cdot(X_{P1}-X_{P2})/$$
$$(v_{b1B'}\cdot h_{b2B'}-v_{b2B'}\cdot h_{b1B'})\}]$$
$$-[W_{rG}\{v_{r1G'}\cdot v_{r2G'}\cdot(X_{P1}-X_{P2})/$$
$$(v_{r1G'}\cdot h_{r2G'}-v_{r2G'}\cdot h_{r1G'})\}$$
$$+W_{gG}\{v_{g1G'}\cdot v_{g2G'}\cdot(X_{P1}-X_{P2})/$$

$$(v_{g1G'} \cdot h_{g2G'} - v_{g2G'} \cdot h_{g1G'})\}$$

$$+ W_{bG}\{v_{b1G'} \cdot v_{b2G'} \cdot (X_{P1} - X_{P2})/$$

$$(v_{b1G'} \cdot h_{b2G'} - v_{b2G'} \cdot h_{b1G'})\}] \quad (53)$$

In order to highly accurately calculate the misconvergence amounts $\Delta D_{RGX}$, $\Delta D_{BGX}$, $\Delta D_{RGY}$, $\Delta D_{BGY}$ using Equations (50) to (53), it is necessary to precisely calculate the hv coordinates $(h_{j1O}, v_{j1O})$, $(h_{j2O}, v_{j2O})$ of the incidence points $o_{j1'}$, $o_{j2'}$ of the optical axes $L_{J1}$, $L_{J2}$ corresponding to the respective CCDs 213R to 213B, 223R to 223B and to align the reference point of the hv coordinate systems on the respective sensing surfaces of the CCDs 213R to 213B, 223R to 223B.

Next, a method for calculating the coordinates of incidence points $o_{j1'}$, $o_{j2'}$ of the optical axes $L_{J1}$, $L_{J2}$ (J=R, G, B) and calibrating the measuring system is described.

In the convergence measurement, the misconvergence amounts are calculated as relative displacements of the luminance center positions with respect to an arbitrary one of the color components R, G, B. Accordingly, the use of the data (coordinate data of incidence points $o_{j1'}$, $o_{j2'}$ of the respective optical axes $L_{J1}$, $L_{J2}$) for calibrating the displacements of the sensing surfaces of the CCDs 213R to 213B, 223R to 223B as relative data of the color components is considered to have a little influence on the measurement accuracy.

Thus, according to this embodiment, the same measurement pattern is used as the one for the calibration and the coordinates of incidence points $o_{j1'}$, $o_{j2'}$ of the optical axes $L_{J1}$, $L_{J2}$ on the sensing surfaces of the CCDs 213R to 213B, 223R to 223B are calculated based on focusing points $I_{r1J}$, $I_{r2J}$ (J=r, g, b, J=R, G, B) corresponding to the measurement points $Q_J$ of the images of the respective color images r, g, b obtained by picking up an image of this measurement pattern as described below.

Specifically, the measurement pattern is displayed on the color display 4 by making only the green phosphors luminous. The coordinates of a measurement point $Q_C$ at this time is assumed to be $Q_C(X_C, Y_C, Z_C)$; the coordinates of the focusing points $I_{r1C}$, $I_{g1C}$, $I_{b1C}$ of the luminous light image of the measurement point $Q_C$ on the sensing surfaces of the CCDs 213R, 213G, 213B to be $I_{r1C}(h_{r1C}, v_{r1C})$, $I_{g1C}(h_{g1C}, v_{g1C})$, $I_{b1C}(h_{b1C}, v_{b1C})$; and the coordinates of the focusing points $I_{r2C}$, $I_{g2C}$, $I_{b2C}$ of the luminous light image of the measurement point $Q_C$ on the sensing surfaces of the CCDs 223R, 223G, 223B to be $I_{r2C}(h_{r2C}, v_{r2C})$, $I_{g2C}(h_{g2C}, v_{g2C})$, $I_{b2C}(h_{b2C}, v_{b2C})$.

This calibration differs from an actual measurement only in that the measurement pattern on the color display 4 is obtained by making only the green phosphors luminous. Accordingly, Equations corresponding to Equations (26), (27), (30), (31), (34), (35) are expressed as follows for the focusing points $I_{r1C}$, $I_{g1C}$, $I_{b1C}$, $I_{R2C}$, $I_{g2C}$, $I_{b2C}$.

$$X_{Cr} = (v_{r1C} \cdot h_{r2C} \cdot X_{P1} - v_{r2C} \cdot h_{r1C} \cdot X_{P2})/$$

$$(v_{r1C} \cdot h_{r2C} - v_{r2C} \cdot h_{r1C}) \quad (54)$$

$$Y_{Cr} = v_{r1C} \cdot v_{r2C} \cdot (X_{P1} - X_{P2})/$$

$$(v_{r1C} \cdot h_{r2C} - v_{r2C} \cdot h_{r1C}) \quad (55)$$

where $v_{r1C} = v_{r1C} - v_{r1O}$ $h_{r1C} = h_{r1C} - h_{r1O}$ $v_{r2C} = v_{r2C} - v_{r2O}$ $h_{r2C} = h_{r2C} - h_{r2O}$ $X_{Cg} = (v_{g1C} \cdot h_{g2C} \cdot X_{P1} - v_{g2C} \cdot h_{g1C} \cdot X_{P2})/$ $$(v_{g1C} \cdot h_{g2C} - v_{g2C} \cdot h_{g1C}) \quad (56)$$

$$Y_{Cg} = v_{g1C} \cdot v_{g2C} \cdot (X_{P1} - X_{P2})/$$

$$(v_{g1C} \cdot h_{g2C} - v_{g2C} \cdot h_{g1C}) \quad (57)$$

where $v_{g1C} = v_{g1C} - v_{g1O}$ $h_{g1C} = h_{g1C} - h_{g1O}$ $v_{g2C} = v_{g2C} - v_{g2O}$ $h_{g2C} = h_{g2C} - h_{g2O}$ $X_{Cb} = (v_{b1C} \cdot h_{b2C} \cdot X_{P1} - v_{b2C} \cdot h_{b1C} \cdot X_{P2})/$ $$(v_{b1C} \cdot h_{b2C} - v_{b2C} \cdot h_{b1C}) \quad (58)$$

$$Y_{Cb} = v_{b1C} \cdot v_{b2C} \cdot (X_{P1} - X_{P2})/(v_{b1C} \cdot h_{b2C} - v_{b2C} \cdot h_{b1C}) \quad (59)$$

where $v_{b1C} = v_{b1C} - v_{b1O}$ $h_{b1C} = h_{b1C} - h_{b1O}$ $v_{b2C} = v_{b2C} - v_{b2O}$ $h_{b2C} = h_{b2C} - h_{b2O}$ Since Equations (54), (56), (58) are equal to each other and Equations (55), (57), (59) are equal to each other, Equations (60) to (63) can be obtained from these Equations (54) to (59).

$$(v_{r1C} \cdot h_{r2C} \cdot X_{P1} - v_{r2C} \cdot h_{r1C} \cdot X_{P2})/(v_{r1C} \cdot h_{r2C} - v_{r2C} \cdot h_{r1C})$$

$$= (v_{g1C} \cdot h_{g2C} \cdot X_{P1} - v_{g2C} \cdot h_{g1C} \cdot X_{P2})/(v_{g1C} \cdot h_{g2C} - v_{g2C} \cdot h_{g1C}) \quad (60)$$

$$(v_{b1C} \cdot h_{b2C} \cdot X_{P1} - v_{b2C} \cdot h_{b1C} \cdot X_{P2})/(v_{b1C} \cdot h_{b2C} - v_{b2C} \cdot h_{b1C})$$

$$= (v_{g1C} \cdot h_{g2C} \cdot X_{P1} - v_{g2C} \cdot h_{g1C} \cdot X_{P2})/(v_{g1C} \cdot h_{g2C} - v_{g2C} \cdot h_{g1C}) \quad (61)$$

$$v_{r1C} \cdot v_{r2C} \cdot (X_{P1} - X_{P2})/(v_{r1C} \cdot h_{r2C} - v_{r2C} \cdot h_{r1C}) = v_{g1C} \cdot v_{g2C} \cdot (X_{P1} - X_{P2})/(v_{g1C} \cdot h_{g2C} - v_{g2C} \cdot h_{g1C}) \quad (62)$$

$$v_{b1C} \cdot v_{b2C} \cdot (X_{P1} - X_{P2})/(v_{b1C} \cdot h_{b2C} - v_{b2C} \cdot h_{b1C}) = v_{g1C} \cdot v_{g2C} \cdot (X_{P1} - X_{P2})/(v_{g1C} \cdot h_{g2C} - v_{g2C} \cdot h_{g1C}) \quad (63)$$

Since a total of 12 coordinates: $o_{r1}(h_{r1O}, v_{r1O})$, $o_{g1}(h_{g1O}, v_{g1O})$, $o_{b1}(h_{b1O}, v_{b1O})$, $o_{r2}(h_{r2O}, v_{r2O})$, $o_{g2}(h_{g2O}, v_{g2O})$, $o_{b2}(h_{b2O}, v_{b2O})$ are to be calculated, at least 12 Equations corresponding to the above Equations (60) to (63) are obtained for at least three measurement points QC(i) (i=1, 2, 3), and the coordinates $o_{j1}(h_{j1O}, v_{j1O})$, $o_{j2}(h_{j2O}, v_{j2O})$ (j=r, g, b) are calculated by solving these Equations. Twelve simultaneous Equations are solved according to a known numerical calculation method by the controller 33.

Although a simple optical model is described in this embodiment, the coordinates $o_{j1}(h_{j1O}, v_{j1O})$, $o_{j2}(h_{j2O}, v_{j2O})$ (j=r, g, b) can be calculated for a model considering a distortion, a model consideration a wavelength dependency of the principal points P1, P2 of the taking lenses 211, 221, a model in which the optical axes $L_R$, $L_G$, $L_B$ of the respective color components and the principal points P1, P2 are not located in the same plane, and other models obtained by combining the above models according to a similar method.

Figure 8:
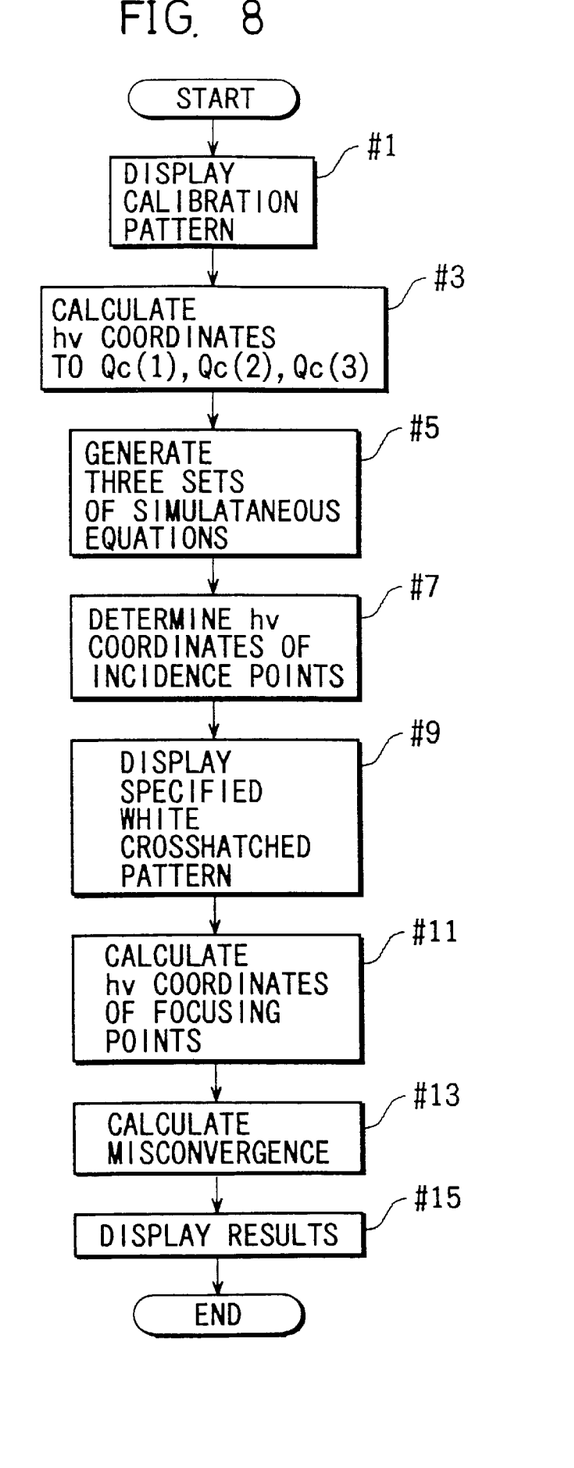
FIG. 8 is a flowchart showing an operation sequence of the convergence measurement apparatus.

Next, an operation sequence of the convergence measurement is described. FIG. 8 is a flowchart showing an operation sequence. The operation sequence shown in FIG. 8 includes a calibration procedure (Steps #1 to #7) for calculating the data for calibrating the displacements of the CCDs 213R to 213B, 223R to 223B (data on the coordinates $o_{j1}(h_{j1O}, v_{j1O})$, $o_{j2}(h_{j2O}, v_{j2O})$ (j=r, g, b) of the incidence points of the optical axes $L_{J1}$, $L_{J2}$ (J=R, G, B)) and a measurement procedure (Steps #9 to #15) for actually calculating the misconvergence amounts.

The calibration procedure may be performed for each color display 4 to be measured in the production line. However, since the displacements of the CCDs do not largely vary unless temperature and/or humidity largely vary, the calibration procedure may be performed when the production line is started or when the measurement apparatus is transferred to a place having difference environments.

In FIG. 8, a specified crosshatched measurement pattern (hereinafter, "calibration pattern") is first displayed on the color display 4 by making only the green phosphors luminous (Step #1). This calibration pattern is displayed in such a size that at least three intersections $Q_C(1)$, $Q_C(2)$, $Q_C(3)$ are included in the sensing frame of the image pickup unit 2.

Subsequently, an image of the calibration pattern is picked up by the image pickup unit 2, and hv coordinates of the focusing points $I_{r1C}(i)(h_{r1C}(i), v_{r1C}(i))$, $I_{g1C}(i)(h_{g1C}(i), v_{g1C}(i))$, $I_{b1C}(i)(h_{b1C}(i), v_{b1C}(i))$, $I_{r2C}(i)(h_{r2C}(i), v_{r2C}(i))$, $I_{g2C}(i)(h_{g2C}(i), v_{g2C}(i))$, $I_{b2C}(i)(h_{b2C}(i)), v_{b2C}(i))$ (i=1, 2, 3) of the CCDs 213R, 213G, 213B, 223R, 223G, 223B corresponding to the intersections $Q_C(1), Q_C(2), Q_C(3)$ are calculated using the picked images (Step #3).

Three sets of simultaneous Equations of Equations (60) to (63) (a total of 12 Equations) are generated using the calculated hv coordinates of the focusing points $I_{r1C}(i)$, $I_{g1C}(i), I_{b1C}(i), I_{r2C}(i), I_{g2C}(i), I_{b2C}(i)$ (i=1, 2, 3) (Step #5). By solving the 12 simultaneous Equations according to the numerical calculation method, the hv coordinates of the incidence points $o_{r1}(h_{r1O}, v_{r1O})$, $o_{g1}(h_{g1O}, v_{g1O})$, $o_{b1}(h_{b1O}, v_{b1O})$, $o_{r2}(h_{r2O}, v_{r2O})$, $o_{g2}(h_{g2O}, v_{g2O})$, $o_{b2}(h_{b2O}, v_{b2O})$ of the optical axes $L_{R1}, L_{G1}, L_{B1}, L_{R2}, L_{G2}, L_{B2}$ of the respective color components are determined (Step #7). Then, the calibration procedure ends.

Subsequently, a specified white crosshatched measurement pattern is displayed on the color display 4 (Step #9). This measurement pattern is displayed in such a size that at least one intersection $Q_J$ is included in the sensing frame of the image pickup unit 2.

Subsequently, an image of the measurement pattern is picked up by the image pickup unit 2, and hv coordinates of the focusing points $I_{r1J}(h_{r1J}, v_{r1J})$, $I_{g1J}(h_{g1J}, v_{g1J})$, $I_{b1J}(h_{b1J}, v_{b1J})$, $I_{r2J}(h_{r2J}, v_{r2J})$, $I_{g2J}(h_{g2J}, v_{g2J})$, $I_{b2J}(h_{b2J}, v_{b2J})$ of the CCDs 213R, 213G, 213B, 223R, 223G, 223B corresponding to the intersection Q are calculated using the picked images (Step #11).

The horizontal (X-direction) misconvergence amounts ΔDRGX, ΔDBGX are calculated in accordance with Equations (50), (51) using the hv coordinates of the incidence points $o_{r1'}, o_{g1'}, o_{b1'}, o_{r2'}, o_{g2'}, o_{b2'}$ of the optical axes $L_{R1}, L_{G1}, L_{B1}, L_{R2}, L_{G2}, L_{B2}$, the hv coordinates of the focusing points $I_{r1J}, I_{g1J}, I_{b1J}, I_{r2J}, I_{g2J}, I_{b2J}$, and the coordinates of the principal points P1, P2 (known) of the taking lenses 211, 221 (Step #13). The calculation results are displayed in the display device 36 in a specified display format (Step #15). Then, the measurement procedure ends.

As described above, the specified calibration pattern is displayed by making only the green phosphors luminous and the displacement amounts of the CCDs 213R to 213B, 223R to 223B of the image pickup unit 2 are calculated as relative displacement amounts using the picked images of the calibration pattern. Accordingly, the calibration data of the displacements of the CCDs 213, 223 due to temperature and/or humidity changes can be easily and quickly calculated, facilitating the calibration of the convergence measurement.

Further, since the calibration data can be calculated using the color display 4 to be measured, the need for a conventional calibration chart can be obviated. This results in a simplified construction and an improved operability of the apparatus.

Only the green phosphors are made luminous to obtain the calibration pattern in the foregoing embodiment. This is because the use of the light emitted from the green phosphors which also has a sensitivity to the red and blue filters enables a quicker measurement. As an alternative, an image of a calibration pattern obtained by making only the red phosphors luminous and an image of a calibration pattern obtained by making only the blue phosphors luminous may be picked up, and the relative displacement mounts of the respective CCDs 213R to 213B, 223R to 223B may be calculated using the image data of the respective color components R, G, B obtained from the picked images.

In the foregoing embodiment, the convergence measurement apparatus 1 of the type which picks up an image of the measurement pattern according to stereoscopic method using the image pickup unit 2 including a pair of image pickup cameras 21, 22. However, according to the invention, the image of the measurement pattern may not necessarily be picked up according to the stereoscopic method. The invention is also applicable to a display characteristic measurement apparatus which adopts an image pickup unit having a single image pickup camera.

Although the convergence measurement apparatus for a color CRT is described in the foregoing embodiment, a display characteristic measurement apparatus according to the invention is also applicable to color display apparatus such as a projection type color display, a color LCD, and a color plasma display or to the measurement of a luminance center position of a monochromatic display apparatus or the measurement of a geometric image distortion.

Although the image pickup unit including three CCDs of primary colors is described in the foregoing embodiment, the image pickup unit is not limited to this type. It may include two image pickup devices (may be pickup tubes), and the color filters may be of primary color type or complimentary color type.

As described above, a measurement pattern is displayed in a single color to which both a first color image pickup device for picking up an image of a first color component and a second color image pickup device for picking up an image of a second color component have a sensitivity. The positions of measurement points of the measurement pattern on the respective sensing surfaces are detected using the images of the measurement pattern picked up by the first and second color image pickup devices, and a displacement of the position of the measurement point on one sensing surface with respect to that on the other sensing surface is calculated as calibration data for calibrating a relative displacement of the positions of the images picked by the first and second image pickup devices. Accordingly, the calibration procedure can be easily and quickly performed.

Further, the use of the image to be displayed on the color display apparatus to be measured for the calibration obviates the need for the conventional chart special for the calibration. This leads to a simplified construction and an improved operability of the display characteristic measurement apparatus.

Particularly, in the color image pickup device in which the image is picked up while being separated into images of three primary color components, the measurement pattern is made luminous in green to which both red and blue image pickup devices have a sensitivity. Thus, by picking up the image of the measurement pattern for the calibration only once, the calibration data can be calculated using the picked image, enabling the calibration procedure to be performed at a higher speed.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A display characteristic measurement apparatus for a color display apparatus, comprising:
   a first image pickup device which picks up an image of a first color component;
   a second image pickup device which picks up an image of a second color component;

a measurement image generator which causes a color display apparatus to display a measurement image thereon, the measurement image being displayed in a single color to which both the first image pickup device and the second image pickup device are sensible; and a calculator which calculates, based on a first picked-up image picked up by the first image pickup device and a second picked-up image picked up by the second image pickup device, calibration data for calibrating a relative displacement between the first image pickup device and the second image pickup device.

2. A display characteristic measurement apparatus according to claim 1, wherein the calculator calculates:

a first position data about a specified position of the measurement image on the color display apparatus based on the first picked-up image;

a second position data about the specified position of the measurement image on the color display apparatus based on the second picked-up image; and calibration data based on the calculated first and second position data.

3. A display characteristic measurement apparatus according to claim 1, wherein:

the first color component is one of the red, green, and blue primary color components;

the second color component is another of the red, green, and blue primary color components; and the measurement image is displayed in green color.

4. A display characteristic measurement apparatus according to claim 3, wherein the measurement image is displayed by making only green phosphors luminous.

5. A display characteristic measurement apparatus according to claim 3, further comprising a third image pickup device which picks up an image of a third color component, wherein the calculator calculates, based on the first picked-up image, the second picked-up image, and a third picked-up image picked up by the third image pickup device, calibration data for calibrating a relative displacement between the first, second, and third image pickup devices.

6. A display characteristic measurement apparatus according to claim 1 is a convergence measurement apparatus which measures a relative displacement of respective luminance centers of a given number of color components on the color display apparatus as a misconvergence amount.

7. A display characteristic measurement apparatus according to claim 6, wherein the measurement image generator which further causes the color display apparatus to display a second measurement image thereon.

8. A display characteristic measurement apparatus according to claim 7, wherein the second measurement image is a white pattern image.

9. A display characteristic measurement apparatus according to claim 7, wherein the second measurement image is a crosshatched pattern.

10. A display characteristic measurement apparatus for a color display apparatus, comprising:

a first image pickup device which picks up an image of a first color component;

a second image pickup device which picks up an image of a second color component;

a measurement image generator which causes a color display apparatus to display a measurement image thereon, the measurement image being displayed in a single color to which both the first image pickup device and the second image pickup device are sensible;

a first position calculator which calculates, based on a first picked-up image picked up by the first image pickup device, a position on the first image pickup device that corresponds to a specified position of the measurement image on the color display apparatus;

a second position calculator which calculates, based on a second picked-up image picked up by the second image pickup device, a position on the second image pickup device that corresponds to the specified position of the measurement image on the color display apparatus; and a displacement calculator which calculates, based on first and second positions calculated by the first and second position calculators, a relative displacement between the first image pickup device and the second image pickup device.

11. A display characteristic measurement apparatus according to claim 10, wherein:

the first color component is one of the red, green, and blue primary color components;

the second color component is another of the red, green, and blue primary color components; and the measurement image is displayed in green color.

12. A display characteristic measurement apparatus according to claim 11, wherein the measurement image is displayed by making only green phosphors luminous.

13. A display characteristic measurement apparatus according to claim 11, further comprising a third image pickup device which picks up an image of a third color component, wherein the displacement calculator calculates, based on the first picked-up image, the second picked-up image, and a third picked-up image picked up by the third image pickup device, a relative displacement between the first, second, and third image pickup devices.

14. A display characteristic measurement apparatus according to claim 10 is a convergence measurement apparatus which measures a relative displacement of respective luminance centers of a given number of color components on the color display apparatus as a misconvergence amount.

15. A method for calibrating a relative displacement between a first image pickup device for picking up an image of a first color component and a second image pickup device for picking up an image of a second color component provided in a display characteristic measurement apparatus for a color display apparatus, comprising the steps:

causing a color display apparatus to display a measurement image thereon, the measurement image being displayed in a single color to which both the first image pickup device and the second image pickup device are sensible;

picking up images of the measurement image displayed on the color display apparatus by the first and second image pickup devices, respectively;

calculating, based on picked-up images of the first and second image pickup devices, calibration data for calibrating a relative displacement between the first image pickup device and the second image pickup device.

16. A method according to claim 15, wherein:

the first color component is one of the red, green, and blue primary color components;

the second color component is another of the red, green, and blue primary color components; and the measurement image is displayed in green color.

17. A method according to claim 16, wherein the measurement image is displayed by making only green phosphors luminous.

* * * * *